Jan. 10, 1961   R. H. DAVIES   2,967,744
ACCUMULATOR
Filed May 6, 1959
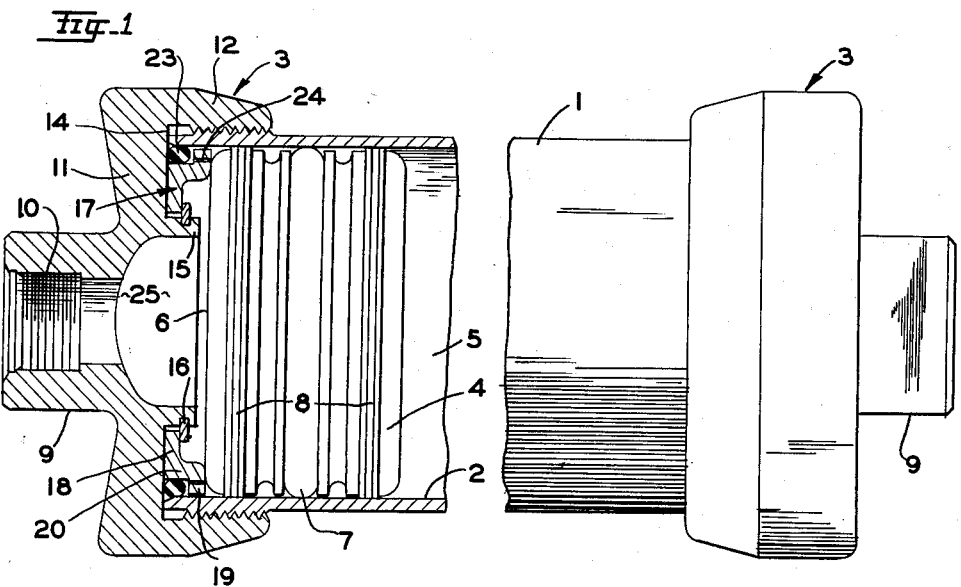
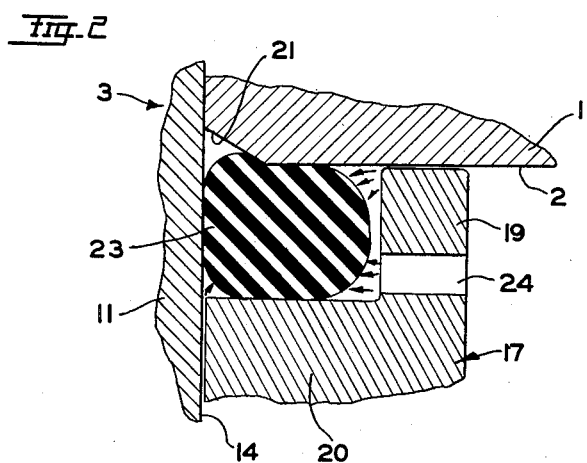
INVENTOR.
ROBERT H. DAVIES
BY
Oberlin, Maky & Donnelly
ATTORNEYS United States Patent Office 2,967,744
Patented Jan. 10, 1961

2,967,744

ACCUMULATOR

Robert H. Davies, Aurora, Ohio, assignor to Parker-Hannifin Corporation, Cleveland, Ohio, a corporation of Ohio Filed May 6, 1959, Ser. No. 811,341

9 Claims. (Cl. 309—2)

The present invention relates generally as indicated to an accumulator and more particularly to improvements in the cylinder head or end cap structure of a hydropneumatic accumulator of the type which comprises a relatively thin wall steel cylinder externally threaded at its opposite ends, end caps or heads screwed onto the ends of said cylinder, and a hollow aluminum or like lightweight alloy piston, reciprocably mounted in the cylinder bore and constituting a partition to divide the chamber defined by the cylinder and the end caps into two separate non-communicating compartments, one of which is adapted to be charged with gas under pressure, usually air, through a port formed in one end cap, and the other of which is connected into a fluid pressure system i.e. a hydraulic system, through a port formed in the other end cap. Thus, the air pressure constantly tends to move the piston in a direction to exert pressure on the oil whereby, when a valve or the like in the hydraulic system is opened to permit flow of oil in the hydraulic system, the pressure drop in the system is minimized, the accumulator serving as a reservoir for high pressure oil and as a shock absorbed or pulsation damper.

Heretofore, in the interest of weight-saving, it has been proposed to make each end cap or head of two-piece construction (a) an inner part of aluminium alloy or the like provided with an integrally threaded port for connection with the hydraulic system or with an air-charging valve, as the case may be, with a recessed inner end determining with the piston the minimum volume of the oil compartment (or the air compartment), with a peripheral packing groove to accommodate an O-ring or the like to make sealed engagement within the inner wall of the cylinder at a zone spaced a substantial distance axially inward of the end of the cylinder, and with a peripheral flange or collar by which said inner part is adapted to be clamped directly against the end of the cylinder; and (b) an outer part or nut of steel or like strong (and heavy) metal which has threaded engagement with the cylinder and which is formed to engage the collar of the inner part to clamp the latter against the end of the cylinder. Although such composite steel and alminimum end cap construction is lighter in weight than when both parts are made of steel, the design has other inherent disadvantages which are desirable to eliminate or minimize. Accordingly, it is an object of the present invention to provide an accumulator end cap structure which not only is lighter than designs heretofore known, including the one just described, but which also provides or retains the following desirable objects or features and which permits optimizing of the same, that is, each individual feature is provided without undue sacrifice in some other feature:

(1) Minimum weight for the required capacity and strength.

(2) Minimum outside diameter (envelope size) for any given inside diameter of the cylinder.

(3) Maximum internal volume for a given overall length and bore diameter, or conversely, a minimum overall length for a given bore diameter and a given internal volume.

(4) Minimum number of machining operations, particularly those requiring high precision.

(5) Ease of assembly and disassambly.

(6) Utilization of cylinder bore as a sealing surface for the end cap packings.

(7) Sealing of end caps assisted by fluid pressure, that is, fluid pressure acts on the packing in a direction toward the surfaces or the leakage paths to be sealed.

(8) Self-centering of end cap packings for maximum sealing efficiency and long life.

(9) Minimum number of parts subject to high stresses.

With the above as objects of the invention, I have discovered that such objects may be obtained and optimized by making the end cap portion which is subject to major stresses in one piece and of light weight alloy and in such manner that it provides a surface for receiving the thrust induced on the packing ring by fluid pressure, and by providing a separate floating ring, which is substantially in axial and radial balance against fluid pressure, for retaining the packing in proper position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

Fig. 1 is a side elevation view, partly in cross-section along the axis thereof, showing a preferred form of accumulator cylinder and head structure; and Fig. 2 is a much enlarged fragmentary cross-section view showing the manner in which an efficient fluid-tight seal is obtained between the cylinder and the head structure.

Referring now in detail to the drawing and first to Fig. 1 thereof, the accumulator herein shown comprises a thin wall cylinder or shell 1 which is formed with a smoothly finished bore 2 therethrough and with externally threaded end portions on which the heads are screwed. Because both heads 3 are of essentially the same construction only one of them has been shown in cross-section in Fig. 1. In practice, especially for use in an aircraft hydraulic system, the accumulator cylinder 1 will be made of corrosion-resisting steel so that its wall thickness may be a minimum to effect weight reduction.

Reciprocable in the cylinder 1 is a hollow piston 4 which, as previously explained and as well known in the art, constitutes a movable partition to form in the cylinder 1 two separate compartments 5 and 6, and in the case of a hydro-pneumatic accumulator, one compartment (herein 5) is the gas pressure compartment and the other compartment (herein 6) is the liquid compartment. The piston 4, intermediate its ends, is formed with a peripheral groove in which is disposed an O-ring 7 or the like, and adjacent its ends is formed with peripheral grooves in which are disposed guide rings 8 as of polytetrafluoroethylene or like material which provide for low friction sliding of the piston 4 in the cylinder bore 2 without metal-to-metal contact with the cylinder bore.

Each head 3 is formed with an axial projection 9 having wrench flats, and a threaded port 10 which, in the case of the head 3 at the left of Fig. 1, is adapted to be connected into the hydraulic system, whereas, the head 3 at the other end will be formed with a similar threaded port, usually of smaller size, for connection of an air charging valve thereto. The head 3 includes a radially outwardly extending flange portion 11 and an axially extending skirt portion 12, the latter being internally threaded as shown for engagement with the external threads at the end of the cylinder 1. The transverse wall 14 of the head 3 is in direct abutting engagement with the end of the cylinder 1 and the radially inner portion of such wall 14 terminates in a tubular lip 15 formed with a peripheral groove in which is engaged a snap ring 16 for holding the packing retaining ring 17 in place in close proximity to such wall 14.

The retaining ring 17 is of angular radial cross-section shape including axially and radially offset flange portions 18 and 19 that are integrally joined together by an intermediate axially extending portion 20. The inner flange portion 18 is of thickness slightly less than the width of the space between wall 14 and snap ring 16 so that fluid (gas or liquid) under pressure may assist in perfecting the seal as hereinafter explained. Also, the inside and outside diameters of the respective flange portions 18 and 19 are slightly greater than and less than the diameters of the lip 15 and bore 2 respectively so that the retaining ring 17 may float radially and thus center itself in the cylinder 1.

It is to be noted that the flange portion 19 and wall 14 constitute the axially spaced end walls of an annular packing chamber and that the axially extending portion 20 and cylinder bore 2 constitute the inner and outer cylindrical walls of such packing chamber. As best shown in Fig. 2, the cylinder bore 2 terminates in a countersink 21. By reason of the aforedescribed radial play between the retaining ring 17 and the head 3 and between the retaining ring 17 and the cylinder bore 2, the O-ring 23 disposed in the aforesaid annular packing chamber will be subjected to uniform radial squeeze all the way around, irrespective of any eccentricity of the cylinder threads with respect to the axis of bore 2 or of the head threads with respect to the outside diameter of the tubular lip 15 thereof.

It is evident that in order to seal the joint between the head 3 and cylinder 1, the packing ring 23 must seal against the transverse surface 14 of the head 3 and the inner surface of the cylinder 1, either at the countersink 21 or the adjacent part of the cylinder base 2. The present invention provides an effective method of directing fluid pressure from within the cylinder into the packing chamber to act on the packing to force the same against such surfaces. Thus, the retaining ring 17 is formed with one or more bleed holes 24 therethrough which, together with the clearance space between bore 2 and the flange portion 19, serve to conduct fluid under pressure in the accumulator into the packing chamber so as to act on the entire radial projected area of the O-ring 23. Thus, the O-ring 23 will be urged into fluid-tight sealing engagement with the transverse wall 14 of the head 3. Such axial force on the end of the O-ring 23 also results in additional radial pressure thereof outwardly against the cylinder bore 2 and inwardly against the bottom wall of the packing chamber as constituted by the outer surface of the axially extending portion 20. Such pressure acting on the O-ring 23 is represented by the small arrows in Fig. 2 acting on the right-hand end of the packing ring. It is to be understood that, in lieu of bleed holes 24, the inner face of flange portion 19 may be formed with radial serrations or grooves to conduct fluid under pressure to so act on the end of the O-ring 23.

Such fluid pressure in the accumulator also finds its way through the minute clearance space between the transverse wall 14 of the head 3 and the juxtaposed inner end face of the flange portion 18 of the retaining ring 17 to assist further in the forcing of the O-ring 23 toward the cylinder bore 2 and particularly toward the region of the junction of the countersink 21 with such cylinder bore 2.

Another feature of this invention is that the packing retaining ring 17 projects axially inwardly beyond the tubular lip 15 of the head 3 so that when the piston 4 moves to either extreme position it engages the retaining ring 17, whereby the force of the piston 4 will be distributed over the relatively large area of contact of flange portion 18 with the transverse wall 14 of head 3. The tubular lip 15 also defines a recess 25 which constitutes a chamber of desired minimum volume when the piston 4 is at one end or the other of its stroke, such chamber being of greater volume in the air compartment 5 owing to the hollow piston 4.

The radially extending flange portion 11 of the head 3 is of tapered cross-section, as shown, to effect yet greater weight reduction, the thinnest portion being reinforced by lip 15 to withstand the force due to fluid pressure and to movement of the piston 4 against the retaining ring 17, and the thickest portion being of such thickness as to withstand the shearing forces resulting from tight screwing of the head 3 on the cylinder 11 with the end of the latter bearing tightly against the transverse wall 14.

It will be noted that the packing ring 23 seals against the bore 2 of the cylinder. This bore is required to have a good finish for sealing against the piston packing ring 7. Utilizing such bore for sealing the end cap joint dispenses with the necessity of providing an additional surface with a finish such as is required for good sealing.

Placing of the packing ring at the extreme end of the bore 2 permits maximum utilization of the internal volume of the cylinder for fluid capacity and also permits subjecting to fluid pressure that portion of the bore 2 which is opposite the threaded connection between the cap member 3 and the cylinder. As a result, any tendency for the cylinder to be expanded by fluid pressure will tend to lock the threads tighter thus and make the threaded joint more secure.

It will also be noted that the snap ring 16 retains the retainer ring 17 and O-ring 23 with the member 3 as a unit and thus facilitates assembly and disassembly of such parts from the cylinder.

In conclusion, it can be seen that the accumulator head structure herein effects substantial reduction in weight because the head 3 itself is of one-piece construction, is of relatively short axial length, and is made of lightweight metal alloy, such as aluminum alloy, and because the packing ring 23 is disposed within the cylinder bore 2 right at the very end thereof. Moreover, the present accumulator cylinder 1 and its heads 3 are easy and economical to manufacture and the novel packing retainer ring 17 and head 3 assembly provides a very efficient and compact sealing arrangement in which fluid pressure is utilized in perfecting the seal between the accumulator cylinder 1 and the respective heads 3 mounted on the ends thereof. The packing retainer ring 17 is preferably made of strong metal such as steel, in order to withstand bottoming of the piston thereagainst.

Other modes of applying the principle of the invention may be employed, change being made as regards the details described, provided the features stated in any of the following claims, or the equivalent of such, be employed.

I therefore particularly point out and distinctly claim as my invention:

1. A cylinder and head structure for accumulators and the like comprising a thin-wall cylinder formed with an externally threaded end portion and with a cylindrical bore therethrough in which a piston is adapted to reciprocate; an internally threaded head screwed onto said cylinder and having a transverse end wall which abuts the end of said cylinder and which extends radially inward of such bore; a packing retainer ring carried by said head including a cylindrical wall which extends axially from such end wall in radially spaced relation to such bore, and a transverse wall which extends radially from such cylindrical wall toward such bore in axially spaced relation to such end wall whereby said head, cylinder, and retainer ring define an annular packing chamber; and an elastic packing ring in such packing chamber effective to make fluid-tight contact with such end wall and bore.

2. The cylinder and head structure of claim 1 wherein said packing ring is radially squeezed in such chamber, and such chamber is formed to conduct fluid under pressure in said cylinder thereinto to act on the radially projected area of said packing ring to press the latter axially into contact with such transverse end wall.

3. The cylinder and head structure of claim 1 wherein said packing retainer ring has radial clearance with said head and such bore to enable centering thereof in said cylinder despite eccentricity of the threads of said cylinder and said head.

4. The cylinder and head structure of claim 1 wherein said packing retainer ring has passages for conducting such fluid under pressure into the region of the junction of such transverse and cylindrical walls thereof.

5. The cylinder and head structure of claim 1 wherein said packing ring is radially squeezed in such chamber, and such chamber is formed to conduct fluid under pressure in said cylinder into the region of the junction of such end wall of said head with such cylindrical wall to act on said packing ring tending to press the latter generally radially outwardly into firmer contact with such bore.

6. The cylinder and head structure of claim 1 wherein such end wall terminates in an axially extending, peripherally grooved tubular lip that extends axially through said packing retainer ring, and a snap ring engaged in the groove of said lip having a portion thereof that radially overlaps said retainer ring to thus hold said head and retainer ring together.

7. The cylinder and head structure of claim 1 wherein said packing ring is radially squeezed in such chamber, and such chamber is formed to conduct fluid under pressure in said cylinder thereinto to act on the radially projected area of said packing ring to press the latter axially into contact with such transverse end wall and into the region of the junction of such end wall of said head with such cylindrical wall to act on said packing ring tending to press the latter generally radially outwardly into firmer contact with such bore.

8. The cylinder and head structure of claim 7 wherein such bore terminates in a countersink to provide a wedge-shaped packing chamber portion into which a portion of said packing ring is bulged under the influence of such fluid under pressure.

9. A lightweight head for an accumulator cylinder and the like comprising a nut-like body integrally formed with a radially extending flange portion, and with an annular recess defined by radially spaced apart and axially extending tubular lip and internally threaded skirt portions and by a transverse end wall of said flange portion; a packing retainer ring disposed in such recess and forming with such end wall a radially outwardly opening packing ring groove; and means detachably securing said ring in such recess.

References Cited in the file of this patent

UNITED STATES PATENTS

| | | |
|---|---|---|
| 1,517,593 | Slate | Dec. 2, 1924 |
| 2,492,006 | Raybould | Dec. 20, 1949 |
| 2,858,802 | Parsons et al. | Nov. 4, 1958 |
| 2,865,693 | Barnhardt | Dec. 23, 1958 |